Dec. 20, 1955　　　J. RABINOW　　　2,727,605
ELECTRODYNAMICALLY OPERATED CLUTCH AND BRAKE
Filed Jan. 31, 1952　　　2 Sheets-Sheet 1

INVENTOR.
Jacob Rabinow
BY
*G. J. Kesserich, J. W. Dew
and D. P. Smith*
Attorneys.

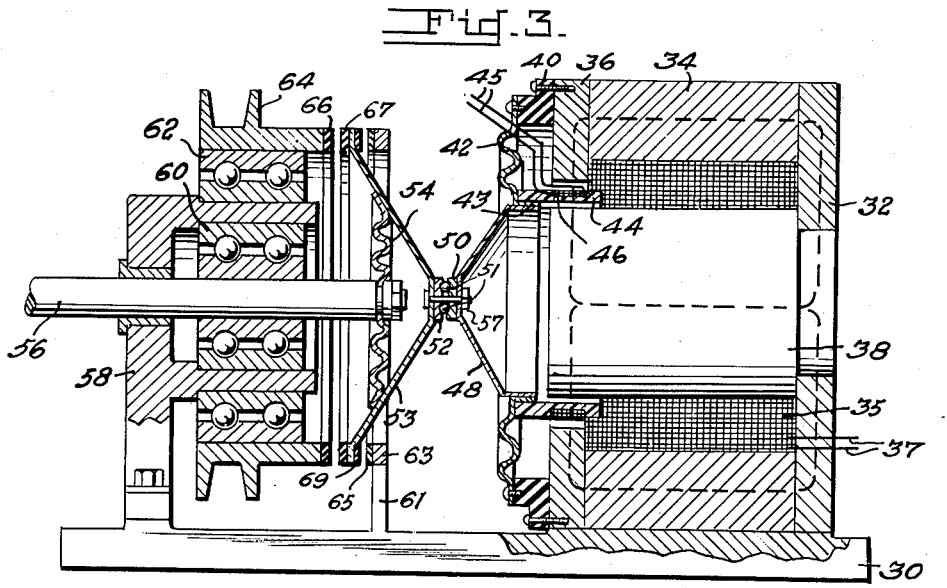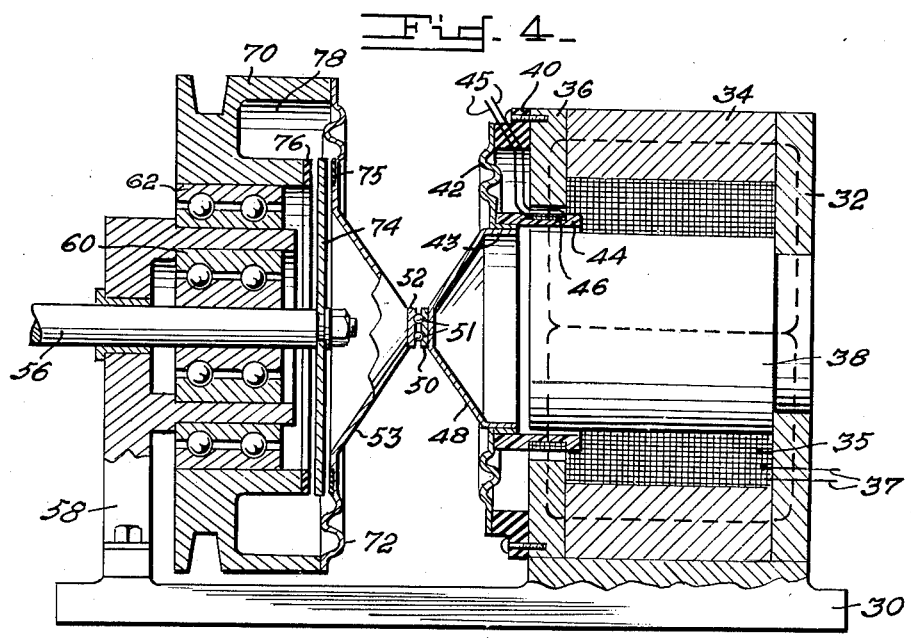

United States Patent Office 2,727,605
Patented Dec. 20, 1955

2,727,605

ELECTRODYNAMICALLY OPERATED CLUTCH AND BRAKE

Jacob Rabinow, Takoma Park, Md., assignor to the United States of America as represented by the Secretary of the Army Application January 31, 1952, Serial No. 269,320

6 Claims. (Cl. 192—18)

(Granted under Title 35, U. S. Code (1952), sec. 266)

The invention described in the specification and claims may be manufactured and used by or for the Government for governmental purposes without the payment to me of any royalty thereon.

This invention relates to electrically-actuated clutches, and has for a primary object the construction of such a clutch that shall be extremely fast in its operation.

In certain applications, and especially in electronic digital computing equipment where high-speed reversal of tape or wire recording is necessary, fast acting clutches are required. For use in such applications, I have invented a type of friction clutch which is engaged by an electrodynamically produced thrust. My clutch utilizes the same principle of operation that is encountered in an electrodynamic loud speaker, that is, there is either a permanent or an electromagnetic field in which a moving coil (similar to the voice coil of the conventional loud speaker) is operated. Utilization of this principle to activate a clutch affords many advantages and novel features among which are:

(1) In ordinary electromagnetic clutches the torque varies as the square of the current, antithetically in my clutch the torque is directly proportional to the current.

(2) In the usual electromagnetic clutch, wherein magnetic fields are created and destroyed in iron structures hysteresis is always present. In my clutch there is no hysteresis and when the current is reduced to zero the force exerted by the "movable coil" also drops to zero.

(3) In order to engage ordinary electromagnetic clutches, it is necessary to build up a field which has to be destroyed for the clutch to release. This gives rise to serious inductive effects which make high speed operation extremely difficult. In my clutch the magnetic field remains constant and the impedance of the "movable coil" is substantially resistive, thus no field is built up by the "movable coil" current and no energy is destroyed when this current is reduced to zero.

(4) The mass of the moving system of my clutch is extremely light, much lighter, in fact, than the mass of a magnetic armature which would give equivalent forces.

(5) There is, theoretically, no upper limit to the force which can be generated by a moving coil, while in an electromagnetic attraction device the upper limit is fixed by magnetic saturation of the iron structure.

It is, therefore, another object of my invention to provide a high speed device for transmitting forces, said device being simple in construction, consisting of few parts and reliable and durable in use.

This and still other objects and novel features of the invention will be apparent from the following description and the accompanying drawings in which:

Figure 4 is a still further species of my invention.

Figure 5 is a fragmentary detail showing a species of coil used in my clutch.

Figure 1:
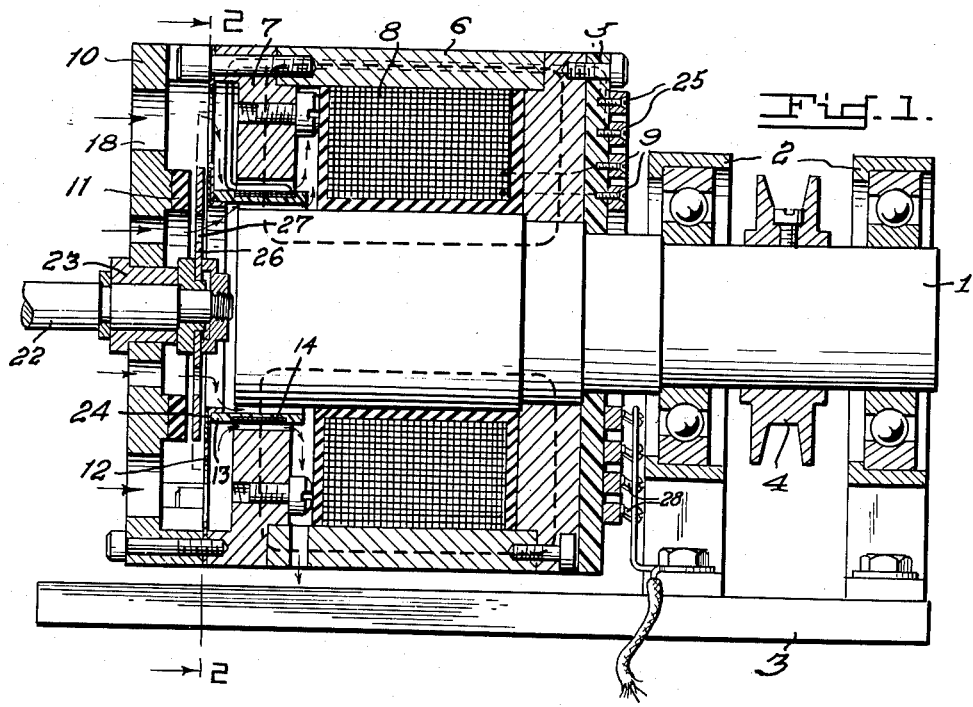
Figure 1 is a longitudinal section view of a form of my clutch which incorporates an electromagnetic field coil.
Figures 2, 3:
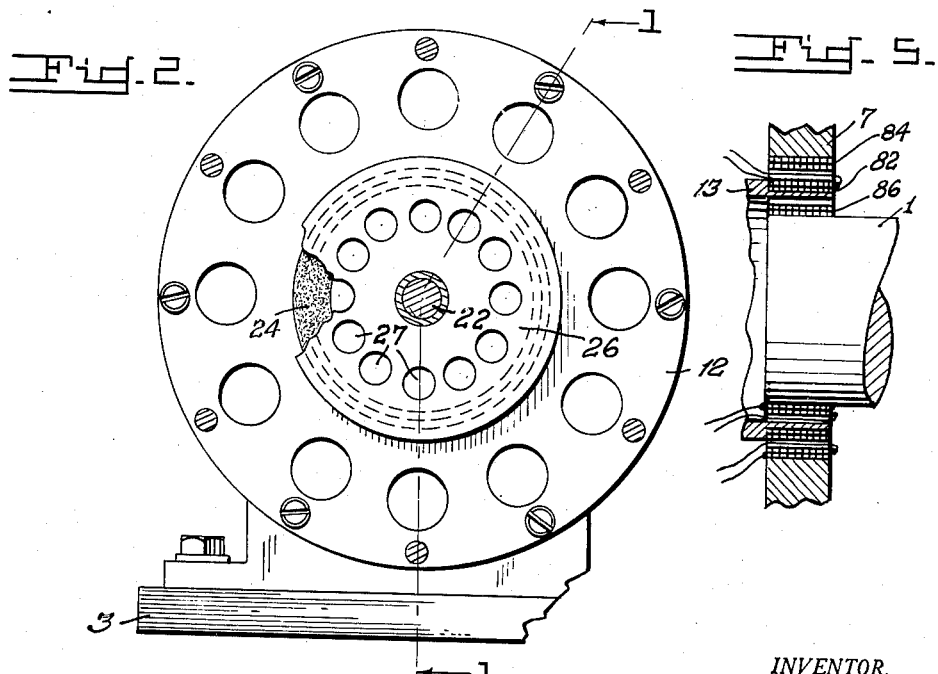
Figure 2 is a cross-sectional view of the clutch of Figure 1, taken on the line 2—2 of the figure and looking in the direction of the arrows.
Figure 3 represents another species of my novel clutch arrangement.

Referring now to Figures 1 and 2 which illustrate a preferred form of my novel clutch, a driving shaft 1 is supported in suitable bearings 2 mounted upon a base plate 3 and is provided with some means of power input such as pulley 4. A housing consisting of back plate 5, ring 6, and end plate 10 supports therein annular pole 7 and field windings 8, the leads of which are connected to slip rings 9. End plate 10 has perforations 18 permitting the circulation of cooling air as indicated by the arrows; and carried by the end plate is an annular friction surface 11 for a purpose to be presently explained. An axially flexible spider 12 is fixed at its periphery between annular pole 7 and plate 10, substantially as shown, and carries friction ring 24 and annular support 13 which has wound thereon coil 14 positioned adjacent pole 7, and having its ends brought out to slip rings 25, which cooperate with suitable brushes, shown generally as 28, in the well known manner. Driven shaft 22 is supported in a bearing 23 in end plate 10 and has clamped thereto axially flexible disc 26 which is normally free to rotate between friction members 11 and 24. Holes 27 are provided in the disc to permit the passage therethrough of cooling air.

Operation

The operation of my novel clutch is as follows: when power is applied to driving shaft 1 through pulley 4 and a load is put on driven shaft 22 then shaft 1 together with the housing, coils and the spider affixed thereto will rotate, but shaft 22 will not move since disc 26 is not engaged by the friction surfaces 11 and 24 opposed thereto.

If now field coil 8 be energized through slip rings 9 it will be understood that flux or lines of force are created in the metal structure, the paths of interest being generally as shown by the dotted lines in Figure 1 and the flux density being a function of the magnetomotive force and reluctance of the magnetic circuit.

When a pulse of current is introduced into coil 14 in the proper direction a mechanical force is developed to forcibly expel the coil from its position adjacent pole piece 7 and moving toward plate 10. Such axial movement causes spider friction ring 24 to bear against disc 26 forcing it against annular friction surface 11 of end plate 10 and the disc, which is a friction surface, is thus squeezed between rings 24 and 12. In this manner the rotation of driving shaft 1 is imparted to driven shaft 22.

Tests indicate that the clutch response time is extremely short. With coil 8 energized and shaft 22 at rest it has been found that in less than 400 microseconds from the time a current pulse is sent to coil 14, shaft 22 will be at full speed.

Direct current has been used to establish the field and to actuate the movable coil, however it will be apparent that alternating current may be used in both windings providing, of course, the phase of the current in the respective coils is the same. It is possible in this connection to vary the thrust on the movable coil by shifting the phase of the currents relative one to the other as well as by varying the amplitude of the currents in any well known manner. It will be further apparent that the field coil disclosed in this or in any of the species that follow may be eliminated by the use of a suitable permanent type magnet in the iron structure thereby eliminating from the clutch organization one set of slip rings and brushes.

An alternative species of my novel clutch is disclosed in Figure 3. A base plate 30 supports the magnetic field assembly which comprises end plate 32 and abutting ring member 34 which in turn abuts annular pole piece 36. A central cylindrical pole piece 38 is suitably secured to and carried by end plate 32 and a field coil 35 having the usual leads 37 connected thereto surrounds the pole piece 38. A supporting plate 40 carries a ribbed spider 42 which is bent into an integral flange 43 to bear a support 44 which has a coil 46 wound thereon and leads 45 for connecting the same to a suitable source of electrical energy. Truncated cone 48 is cemented or otherwise firmly affixed to spider flange 43 and is provided with an antifriction thrust bearing race 50. Axially aligned with bearing race 50 is positioned a similar antifriction thrust bearing race 52 which is carried by truncated cone 53 and is supported by ribbed disc 54 carried by driven shaft 56 which is free to rotate. Thrust pin 57 pierces races 50 and 52 for a purpose to be presently explained. Cone 53 is bent back upon itself at its base portion to form a flat which has cemented or otherwise secured thereto a friction ring 67 for a purpose that will presently appear. Mounting bracket 58 receives a plurality of antifriction bearings substantially as shown. Inner bearing 60 maintains driven shaft 56 in proper alignment and outer bearing 62 which is embraced by input pulley housing 64 permits the same to rotate when rotative power is applied thereto. An annular friction ring 66 is cemented to or otherwise firmly affixed to the side of pulley housing 64 in normally spaced and concentric relation with friction ring 67. Standard 61 carries ring 63 embracing cone 53 and axially spaced therefrom. A friction surface 65 is provided on ring 63 in opposed relation with a mating friction surface 69 carried at the base of cone 53.

The operation of this species is similar to the preferred embodiment of my invention described supra in that energization of field coil 35 creates a magnetic field in the usual manner, the flux paths of interest being substantially as shown in the dotted lines. When pulley housing 64 is rotated it will be apparent that driven shaft 56 remains stationary because of the spacing between friction rings 66 and 67. If now current of the correct polarity be introduced into coil 46 a mechanical force is developed to forcibly expel the coil from its position adjacent pole piece 36, and bearing 50 race thrusts against bearing race 52 through balls 51 to move cone 53 axially on its resilient supporting disc 54 by which motion friction rings 66 and 67 are engaged and the rotation of the pulley housing is transmitted to the driven shaft. If the driving and driven members 64 and 56 are rotating together and it is desired to stop driven member 56 in a minimum time then coil 46 is deenergized quickly reenergized by a reversing switch or the like with current in the opposite direction so that a mechanical force is now developed to force coil 46 to the right, as seen in the figure. Cone 43 and bearing race 50 will move with coil 46, and thrust pin 57 will carry cone 53 and friction surface 69 against fixed friction surface 65 and the rotative energy in shaft 56 will be quickly dissipated, bringing the shaft to a stop.

The advantage of this species lies in the fact that all coils requiring energization are stationary and the need for slip rings and brushes is obviated.

A still further species of my clutch is revealed in Figure 4 where the coil housing structure is identical with that described in Figure 3 but a closed chamber is provided to protect the moving parts of the friction surfaces from dust or foreign matter as will now be explained. Pulley housing 70 has secured and sealed thereto ribbed spider 72 which has friction ring 75 thereon and truncated cone 53 peripherally fastened or made integral therewith and bearing race 52 at the apex thereof. Flexible friction disc 74 turns with driven shaft 56 and is disposed in axially spaced sandwiched relation with friction rings 76 and 75. A substantial annular chamber 78 is located within pulley housing 70 adjacent the ribbed portion of spider 72 to eliminate any possibility of the entrapped air behind spider 72 resisting the axial movement thereof.

With coil 35 energized and a pulse of electrical energy is applied to coil 46 cone 48 is expelled from its normal position and bearing race 50 thrusts against bearing race 52 through balls 51 to move cone 53 and spider 72 axially, whereby disc 74 is clamped between friction rings 76 and 75 to lock the driving and driven members together.

In Figure 5 is shown an alternative manner of coil arrangement which is based on the general structure of Figure 1 but which, it will be understood, is equally applicable to any of the species disclosed. Reference characters 1, 7, and 13 indicate the shaft, pole and coil support, as above, and 82, 84 and 86 indicate three concentric coils physically separated and non-inductively wound as will be explained. Coil 82 for example contains N turns and is wound clockwise, coils 84 and 86 each contain N/2 turns and are wound counterclockwise and all coils are connected in series. It has been found in practice that the number of turns and the spacing may be so selected that the physical thrust can be equivalent to the simple annular coil but the time for current rise is greatly reduced because of the lower inductance, thereby effecting more rapid clutch action.

It will be understood that in each of the species disclosed the driving and driven members may be normally engaged and the energization of the movable coil may be utilized to separate them thereby disengaging the clutch.

It will be further understood that either member may be held stationary whereby a braking effect upon the rotating member is obtained when the coils are energized.

The exact arrangement shown is illustrative only and I therefore wish it to be understood that I do not consider my invention to be confined to the structural details revealed but I intend its scope to be indicated by the accompanying claims.

I claim:

1. A coupling device for controlling the transmission of force between two relatively movable members comprising a first friction means fixed to one of said members, a second friction means fixed to the other of said members, said first and second friction means normally disposed in spaced relationship, and means to bias the said first and second friction means toward each other, said last mentioned means comprising means to produce a magnetic field, a light weight coil in said field, coupling means between said coil and said first friction means, said coupling means comprising two truncated conical members fixed in apex abutting relationship, and means to supply electric energy to said light weight coil whereby a mechanical force is produced.

2. The invention according to claim 1 including a third friction means fixed against rotation and so disposed that the said first friction means is between the said second friction means and the said third friction means, and said means to supply electrical energy in such a direction that the said first friction means is moved toward the said third friction means.

3. A quick acting magnetic clutch comprising a rotatable driving shaft, a magnetic field member fixed to and about said driving shaft adjacent an end thereof for rotation therewith, a cylindrical casing for said field member, said casing forming an annular magnetic pole constructed to provide an annular gap between said pole and the cylindrical surface of said shaft at said end thereof, a first light weight coil fixed to the inner periphery of said annular magnetic pole, a second light weight coil fixed to the outer periphery of said shaft, an axially flexible supporting member fastened to said casing and extending inwardly toward said driving shaft, a third light weight coil carried by said supporting member and arranged in concentric relationship with said first and second coil the three coils connected in series, an end plate fastened to said cylindrical casing extending across the end of said driving shaft and axially therefrom, a first annular friction surface fixed to said supporting member, a second annular friction surface fixed to said end plate, a rotatable driven shaft extending through said end plate and carrying a flexible disc arranged to lie between the said first and second friction surfaces said driving and said driven shafts being axially aligned.

4. A quick acting magnetic clutch comprising a rotatable driving shaft, a magnetic field member fixed to and about said driving shaft adjacent an end thereof for rotation therewith, a cylindrical casing for said field member, sliprings on said casing connected to said field winding for supplying current thereto, said casing forming an annular magnetic pole constructed to provide an annular gap between said pole and the cylindrical surface of said shaft at said end thereof, an axially flexible supporting member fastened to said casing and extending inwardly toward said driving shaft, a light weight cylindrical coil carried by said supporting member and extending into said annular gap, additional sliprings carried by said casing and connected to said cylindrical coil for supplying control current thereto, an end plate fastened to said cylindrical casing extending across the end of said driving shaft and axially spaced therefrom, a first annular friction surface fixed to said end plate, a rotatable driven shaft extending through said end plate and carrying a flexible disc, a second annular friction surface fixed to said flexible supporting member opposed to said first annular friction surface, said driving and said driven shafts being axially aligned.

5. A quick acting magnetic clutch comprising a rotatable driving member, a rotatable driven member, a cylindrical housing, a magnetic field member fixed to and carried by said housing, a cylindrical shaft forming the axis of said housing, said housing forming an annular magnetic pole constructed to provide an annular gap between said pole and the surface of said shaft at an end thereof, an axially flexible supporting member fastened to said housing and extending toward said shaft, a light weight cylindrical coil carried by said supporting member and extending into said annular gap, a first truncated conical element secured at the base thereof to said supporting member and arranged in apex abutting relation with a second conical element, a first friction surface on the base of said second conical element and normally spaced from a second friction surface on said driving member, said second conical element flexibly joined to said rotatable driven member.

6. A quick acting magnetic clutch comprising a rotatable driving member and a rotatable driven member, a cylindrical housing, a magnetic field member fixed to and carried by said housing, a cylindrical shaft forming the axis of said housing, said shaft embraced by said magnetic field member, said housing forming an annular magnetic pole constructed to provide an annular gap between said pole and the surface of said shaft at an end thereof, an axially flexible supporting member fastened to said housing and extending toward said shaft, a light weight cylindrical coil carried by said supporting member and extending into said annular gap, a first truncated conical element secured at the base thereof to said supporting member and arranged in apex abutting relationship with a second conical element, a dust tight flexible annular suspension member constructed to join the base of said second conical element to said rotatable driving member, a first friction surface formed on said rotatable driving member, a second friction surface in normal spatial relationship with said first friction surface and carried by said second conical element.

References Cited in the file of this patent

UNITED STATES PATENTS

| 387,310 | Mather | Aug. 7, 1888 |
| 439,213 | Veeder | Oct. 28, 1890 |
| 480,889 | Weston | Aug. 16, 1892 |
| 1,123,411 | Smith et al. | Jan. 5, 1915 |
| 1,963,638 | Wilsing | June 19, 1934 |
| 2,004,735 | Thomas | June 11, 1935 |
| 2,503,243 | Cohen | Apr. 11, 1950 |
| 2,591,510 | Clark | Apr. 1, 1952 |
| 2,618,368 | Hoover | Nov. 18, 1952 |
| 2,675,900 | Malick | Apr. 20, 1954 |

FOREIGN PATENTS

| 15,390 | Great Britain | June 26, 1914 |